US012632813B2

(12) United States Patent
Zhang et al.

(10) Patent No.: US 12,632,813 B2
(45) Date of Patent: May 19, 2026

(54) QUANTUM RATING FRAMEWORK

(71) Applicant: S&P Global Inc., New York, NY (US)

(72) Inventors: Yili Zhang, Logan, UT (US); Jia Zhao, Logan, UT (US); Giles Thompson, London (GB); Lapo Guadagnuolo, London (GB); Marcus Isaac Daley, Provo, UT (US)

(73) Assignee: S&P Global Inc., New York, NY (US)

( * ) Notice: Subject to any disclaimer, the term of this patent is extended or adjusted under 35 U.S.C. 154(b) by 631 days.

(21) Appl. No.: 17/651,277

(22) Filed: Feb. 16, 2022

(65) Prior Publication Data

US 2023/0259853 A1     Aug. 17, 2023

(51) Int. Cl.
| | |
|---|---|
| *G06Q 10/00* | (2023.01) |
| *G06N 10/00* | (2022.01) |
| *G06N 10/20* | (2022.01) |
| *G06Q 10/0635* | (2023.01) |

(52) U.S. Cl.
CPC ......... *G06Q 10/0635* (2013.01); *G06N 10/20* (2022.01)

(58) Field of Classification Search
CPC .............................. G06Q 10/00; G06N 10/20
USPC ....................................................... 705/7.28
See application file for complete search history.

(56) References Cited

U.S. PATENT DOCUMENTS

| | | | |
|---|---|---|---|
| 2019/0378208 A1* | 12/2019 | Woerner ................ | G06N 10/70 |
| 2022/0108318 A1* | 4/2022 | Ramasamy ........ | G06Q 20/4016 |
| 2022/0300972 A1* | 9/2022 | Davies .............. | G06Q 20/4014 |
| 2023/0298101 A1* | 9/2023 | Ajagekar .............. | G06N 10/80 705/36 R |
| 2023/0385677 A1* | 11/2023 | Rosenkranz .......... | G06N 10/60 |
| 2023/0419153 A1* | 12/2023 | Stamatopoulos ...... | G06N 10/20 |

OTHER PUBLICATIONS

Daniel J. Egger "Credit Risk Analysis Using Quantum Computers" Dec. 12, 2021 (Year: 2021).*

* cited by examiner

*Primary Examiner* — Mustafa Iqbal
(74) *Attorney, Agent, or Firm* — Yee & Associates, P.C.

(57) ABSTRACT

A computer-implemented method for calculating risk is provided. The method comprises receiving, at a first time, respective deterministic values for a number of factors. Over an evolution time interval starting at the first time, respective stochastic quantum values are generated for each factor from the deterministic values. Each factor is represented by a respective N-qubit quantum circuit, wherein each qubit represents a risk level. The quantum values for the factors are combined into an intermediate quantum risk value at a second time at the end of the evolution time interval. The intermediate quantum risk value according is then modified to a number of classical parameters, and a final stochastic quantum risk value at the second time is generated from the modified intermediate quantum risk value.

24 Claims, 11 Drawing Sheets

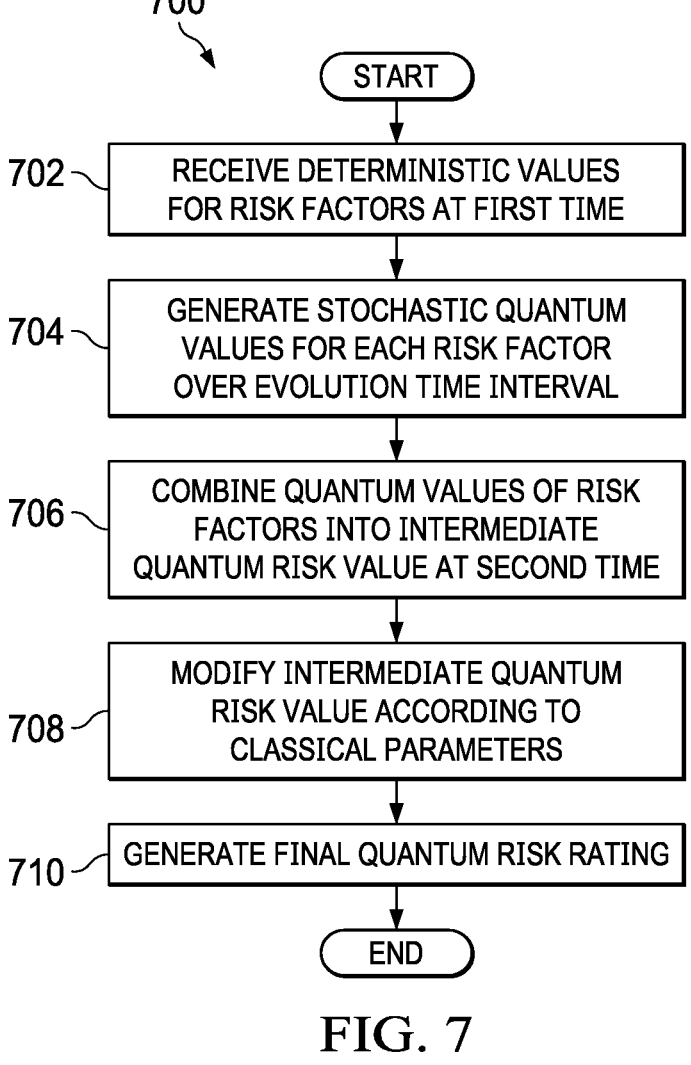

700

START

702 — RECEIVE DETERMINISTIC VALUES FOR RISK FACTORS AT FIRST TIME

704 — GENERATE STOCHASTIC QUANTUM VALUES FOR EACH RISK FACTOR OVER EVOLUTION TIME INTERVAL

706 — COMBINE QUANTUM VALUES OF RISK FACTORS INTO INTERMEDIATE QUANTUM RISK VALUE AT SECOND TIME

708 — MODIFY INTERMEDIATE QUANTUM RISK VALUE ACCORDING TO CLASSICAL PARAMETERS

710 — GENERATE FINAL QUANTUM RISK RATING

END

FIG. 7

QUANTUM RATING FRAMEWORK

BACKGROUND INFORMATION

1. Field

The present disclosure relates generally to credit risk rating, and more specifically to a method for rating credit risk based on quantum computing.

2. Background

When deriving a credit rating for a financial instrument it is not unusual to see an approach where the final rating is a construction based on the interaction of specific factors and sub-factors. Each factor represents a dimension of the analysis that characterizes a specific risk, a financial ratio or any other observable likely to impact the performance of a rating over time. These factors and sub-factors are structured in a pipeline that captures their relationship and links the factors and sub-factors to an indicative rating.

Research on quantum computation and algorithms has been growing in recent years. Quantum computers exploit the unique, non-classical properties of the quantum systems from which they are built, allowing them to process exponentially large quantities of information in only polynomial time. In the same way classical computation quickly branched away from its narrow beginnings facilitating simulations of Newtonian mechanics, the study of quantum algorithms has diverged greatly from simply simulating quantum physical systems to impact a wide variety of fields, including information theory, cryptography, language theory, and mathematics.

Therefore, it would be desirable to have a method and apparatus that take into account at least some of the issues discussed above, as well as other possible issues.

SUMMARY

An illustrative embodiment provides a computer-implemented method for calculating risk. The method comprises receiving, at a first time, respective deterministic values for a number of factors. Over an evolution time interval starting at the first time, respective stochastic quantum values are generated for each factor from the deterministic values. Each factor is represented by a respective N-qubit quantum circuit, wherein each qubit represents a risk level. The quantum values for the factors are combined into an intermediate quantum risk value at a second time at the end of the evolution time interval. The intermediate quantum risk value according is then modified to a number of classical parameters, and a final stochastic quantum risk value at the second time is generated from the modified intermediate quantum risk value.

Another illustrative embodiment provides a system for calculating risk. The system comprises a storage device configured to store program instructions and one or more processors operably connected to the storage device and configured to execute the program instructions to cause the system to: receive, at a first time, respective deterministic values for a number of factors; generate, over an evolution time interval starting at the first time, respective stochastic quantum values for each factor from the deterministic values, wherein each factor is represented by a respective N-qubit quantum circuit, wherein each qubit represents a risk level; combine the quantum values for the risk factors into an intermediate quantum risk value at a second time at the end of the evolution time interval; modify the intermediate quantum risk value according to a number of classical parameters; and generate, from the modified intermediate quantum risk value, a final stochastic quantum risk value at the second time.

Another illustrative embodiment provides a computer program product for calculating risk. The computer program product comprises a computer-readable storage medium having program instructions embodied thereon to perform the steps of: receiving, at a first time, respective deterministic values for a number of factors; generating, over an evolution time interval starting at the first time, respective stochastic quantum values for each factor from the deterministic values, wherein each risk factor is represented by a respective N-qubit quantum circuit, wherein each qubit represents a risk level; combining the quantum values for the risk factors into an intermediate quantum risk value at a second time at the end of the evolution time interval; modifying the intermediate quantum risk value according to a number of classical parameters; and generating, from the modified intermediate quantum risk value, a final stochastic quantum risk value at the second time.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 depicts a flowchart illustrating a process for rating risk in accordance with an illustrative embodiment.

DETAILED DESCRIPTION

The illustrative embodiments recognize and take into account one or more different considerations. The illustrative embodiments recognize and take into account that credit ratings are often construction based on the interaction of specific factors and sub-factors. Each factor represents a dimension of the analysis that characterizes a specific risk, a financial ratio, or other observable likely to impact the performance of a rating over time.

The illustrative embodiments also recognize and take into account that quantum computers exploit the unique, non-classical properties of the quantum systems from which they are built, allowing them to process exponentially large quantities of information in only polynomial time.

The illustrative embodiments also recognize and take into account that the study of quantum algorithms has diverged greatly from simply simulating quantum physical systems to impact a wide variety of fields and can be applied to risk analysis of financial instruments.

The illustrative embodiments provide a general-purpose quantum rating system that takes deterministic input values for risk factors at a first time $(t_1)$ and generates an intermediate stochastic quantum risk value at a second time $(t_2)$. This intermediate quantum risk value is then modified by a number of classical parameters to arrive at a final quantum risk rating result.

Figure 1:
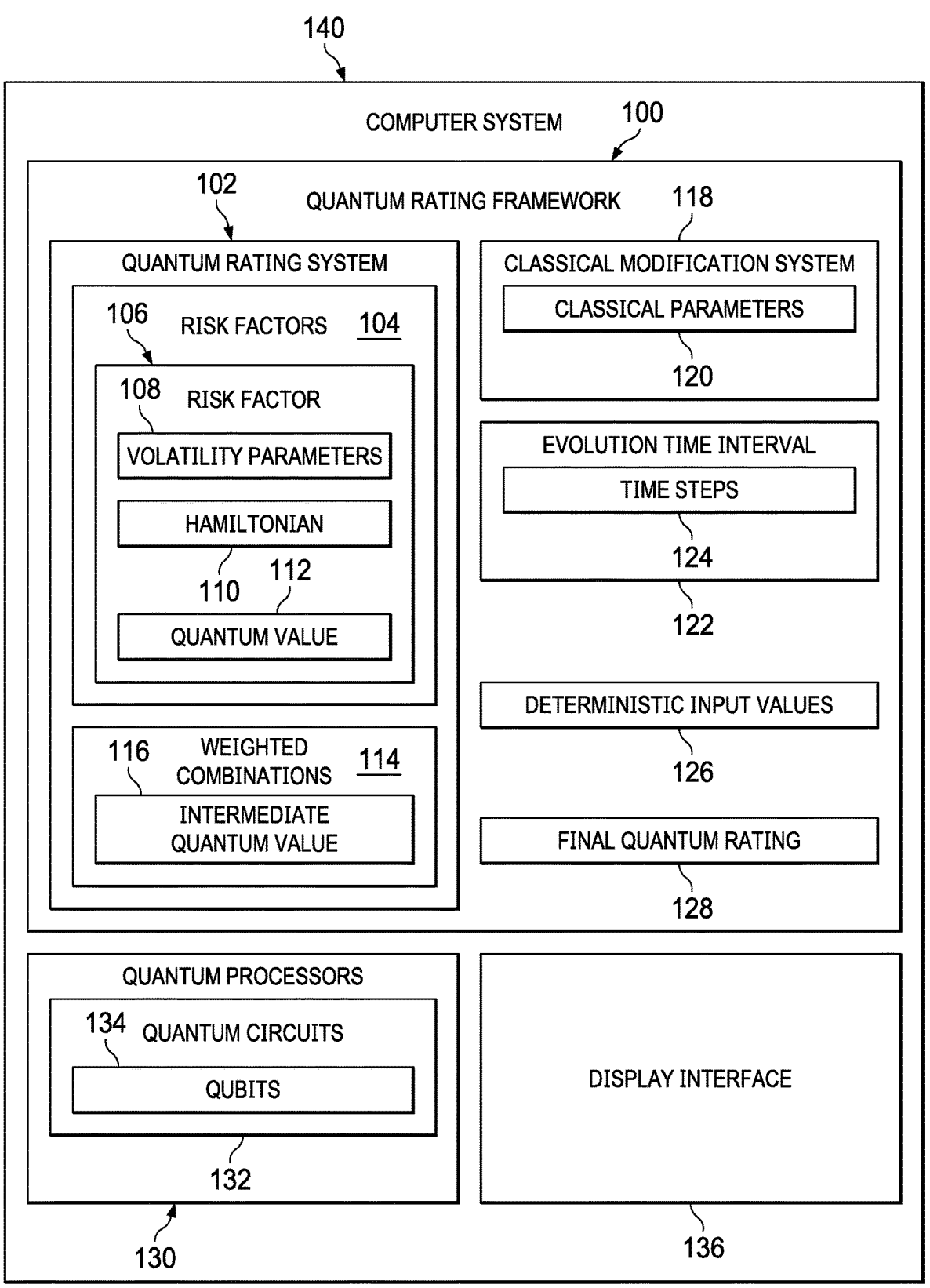
FIG. 1 depicts a block diagram of a Quantum Rating Framework in accordance with an illustrative embodiment.

FIG. 1 depicts a block diagram of a quantum rating framework in accordance with an illustrative embodiment. Quantum rating framework 100 comprises quantum rating system 102 and classical modification system 118.

Quantum rating system 102 generates stochastic quantum values for a number of risk factors 104 from deterministic input values 126. For each risk factor 106, quantum rating system 102 determines a stochastic quantum value 112 based a unique Hamiltonian 110 differentiated by volatility parameters 108 unique to that risk factor. Quantum rating system combines the stochastic quantum values 112 of the different risk factors 104 into weighted combinations 114 to generate intermediate quantum value 116.

Classical modification system 118 applies a number of classical parameters 120 to the intermediate quantum value 116 to generate the final quantum rating 128. Classical parameters 120 may include diversification/portfolio effect, capital structure, financial policy, liquidity, management/governance, and comparable ratings analysis.

The deterministic input 126 and intermediate quantum rating 116 apply to different points of time that define an evolution time interval 122 (e.g., a year). The evolution time interval 122 may be divided into a number of time steps/subintervals 124 (e.g., months), each with its own respective volatility parameters and sub-Hamiltonians.

The respective stochastic quantum values 112 of the risk factors 104 may be calculated with a number of quantum circuits 132 running on a number of quantum processors

130. The quantum circuits 132 may comprise a number of qubits 134 representing different risk ratings.

The stochastic quantum values 112 for the risk factors 104, weighted combinations 114, and final quantum rating 128, may be displayed to a user on display interface 136.

Computer system 140 is a special purpose computer system comprising quantum circuits 132 specifically designed to generate stochastically distributed risk ratings from initial deterministic values. Computer system can incorporate significantly more factors and process exponentially large quantities of information simultaneously in only polynomial time in comparison to general-purpose computing systems used for classical rating methods.

Quantum rating framework 100 can be implemented in software, hardware, firmware or a combination thereof. When software is used, the operations performed by quantum rating framework 100 can be implemented in program code configured to run on hardware, such as a processor unit. When firmware is used, the operations performed by quantum rating framework 100 can be implemented in program code and data and stored in persistent memory to run on a processor. When hardware is employed, the hardware may include circuits that operate to perform the operations in quantum rating framework 100.

As used herein a processor is comprised of hardware circuits such as those on an integrated circuit that respond and process instructions and program code that operate a computer. When a number of processors execute instructions for a process, the processors can be on the same computer or on different computers. In other words, the process can be distributed between processors on the same or different computers in computer system. Further, the number of processors can be of the same type or different type of processors. For example, a number of processors can be selected from at least one of a single core processor, a dual-core processor, a multi-processor core, a general-purpose central processing unit (CPU), a digital signal processor (DSP), or quantum hardware comprising quantum circuits based on qubits (quantum bits).

These components can be located in a computer system 140, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, quantum hardware, or some other suitable data processing system.

Figure 2:
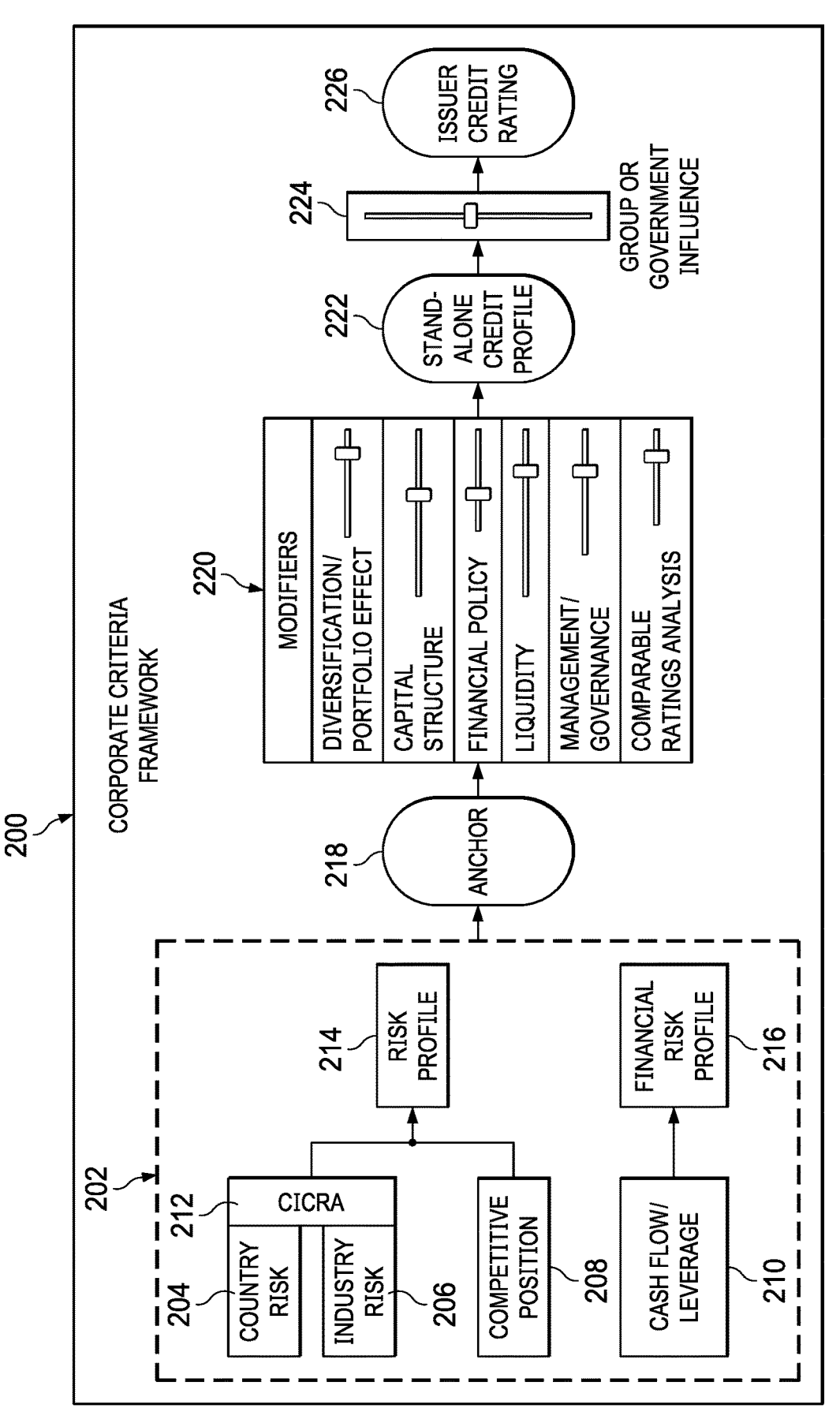
FIG. 2 depicts a block diagram of a classical corporate criteria framework in accordance with the prior art.

FIG. 2 depicts a block diagram of a classical corporate criteria framework in accordance with the prior art. Corporate criteria framework 200 illustrates how a corporate system is rated classically. Through the corporate criteria framework 200, the rating is always deterministic, meaning that a given rating has 100% of a particular value at a given point in time. For example, if a risk factor is scored on a scale of 1-6, at time the score will be 100% 2 or 100% 5, etc.

Classical rating system 202 comprises a number of risk factors. In the present example, these risk factors include country risk 204, industry risk 206, competitive position risk 208, and cash flow/leverage 210. These risk factors may be combined into a number of combinations and sub-combinations. In the present example, country risk 204 and industry risk 206 can be combined into Country/Industry Credit Risk Assessment (CICRA) 212. CICRA 212 may then be combined with competitive position risk 208 to form risk profile 214. Cash flow/leverage risk 210 can be used to derive a financial risk profile 216, which can be combined with the risk profile 214 to produce an anchor value 218.

Anchor value 218 may be modified by a number of modifiers 220, which may be that same as classical parameters 120 in FIG. 1. Modification of anchor value 218 produces a standalone credit profile 222, which may be further modified by group or government influence 224 to generate a final issuer credit/risk rating 226. In this context, "group" refers to a corporate group comprising a parent company and subsidiaries. The final credit rating 226 of a company may be impacted by the credit rating of the corporate group to which it belongs.

The illustrative embodiments, the classical rating system 202 of the classical criteria framework 200 is replaced by a quantum rating system that produces a stochastic distribution in place of deterministic anchor value 218.

Figure 3:
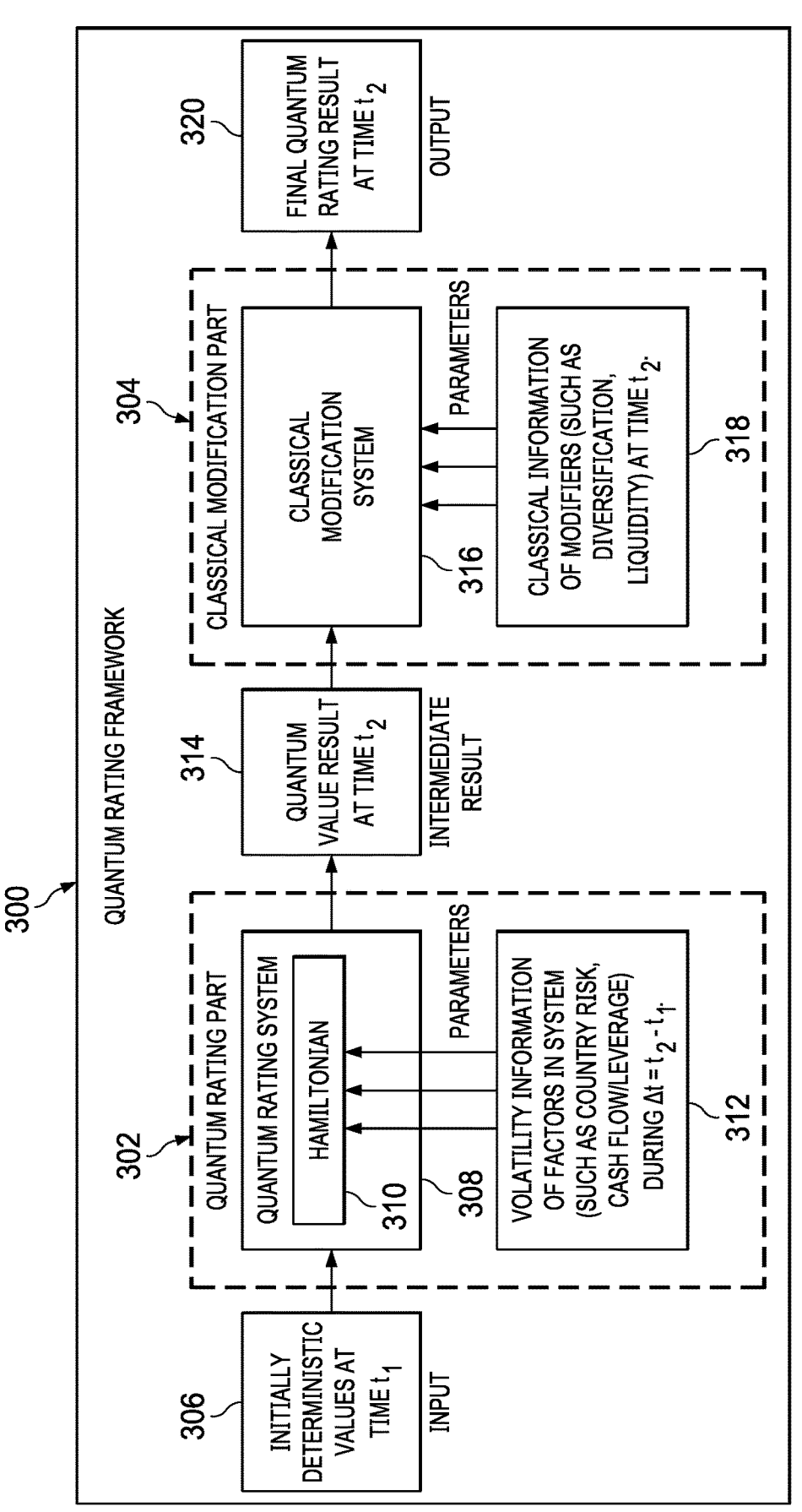
FIG. 3 depicts a block diagram illustrating the operation of a quantum rating framework in accordance with an illustrative embodiment.

FIG. 3 depicts a block diagram illustrating the operation of a quantum rating framework 300 in accordance with an illustrative embodiment. Quantum rating framework 300 may be an example implementation of quantum rating framework 100 in FIG. 1. The quantum rating framework 300 is composed of two parts: The quantum rating part 302 and the classical modification part 304.

The quantum rating part 302 is the core of the quantum rating framework 300, in which a quantum rating system 308 takes initially deterministic values of factors (such as, e.g., country risk factor, etc., in the corporate rating system) as inputs 306 at time $t_1$. The Hamiltonians 310 in the quantum rating system 308 take volatility information 312 of the factors during a time period $\Delta t$ as their parameters. The initially deterministic input values 306 can evolve into corresponding quantum values with stochastic distributions by incorporating their volatility information 312 during an evolution time interval, $\Delta t$.

By combining the quantum values of the risk factors, a stochastic quantum value for the rating objective (e.g., anchor value 218 in FIG. 2) is output from the quantum rating part 302 as an intermediate quantum value result 314 at time $t_2$, where $t_2=t_1+\Delta t$.

The classical modification part 304 modifies and fine-tunes the intermediate quantum value result 314 from the quantum rating part 302 at time $t_2$. The classical modification part 304 comprises a classical modification system 316, which takes the intermediate quantum value result 314 at time $t_2$ as input and uses the classical information 318 of modifiers (such as diversification, liquidity in the corporate rating system, etc.) as parameters for classical analysis.

After the intermediate quantum value result 314 is classically modified by the classical modification system 316, a final quantum rating result 320 at time $t_2$ is output for the rating objective. It should be noted that the classical modification system 316 can be either quantum-based or non-quantum-based in processing the modifiers.

While the quantum rating framework 300 is useful for general-purpose rating systems because all qualitative and quantitative information of a factor can be conceptualized as relative volatilities, the present discussion uses the corporate rating system as an example to illustrate how the quantum rating framework 300 operates.

Figure 4A:
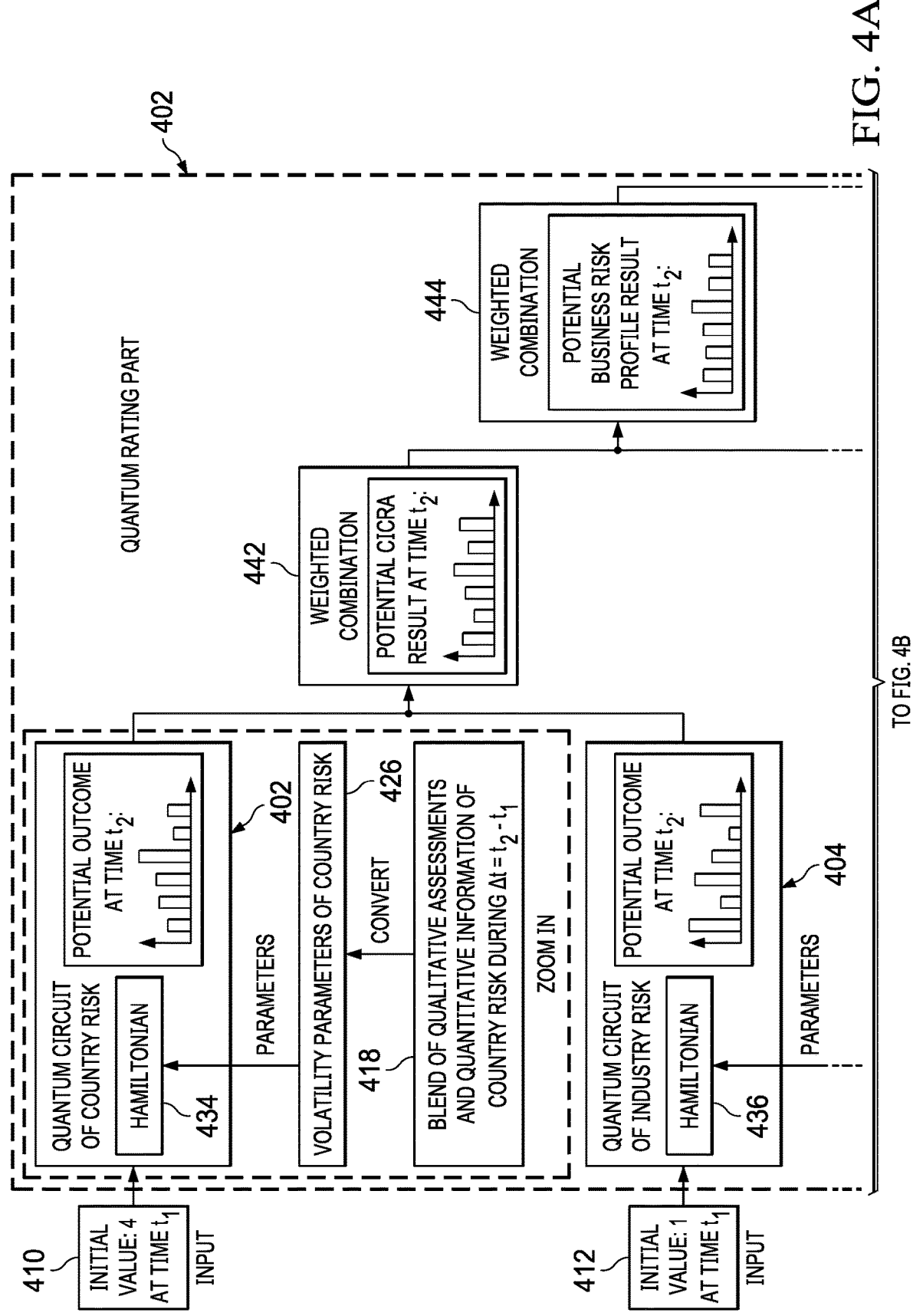
FIG. 4A depicts a block diagram illustrating a detailed view of a first section of the quantum rating part within the quantum rating framework in accordance with an illustrative embodiment.
Figure 4B:
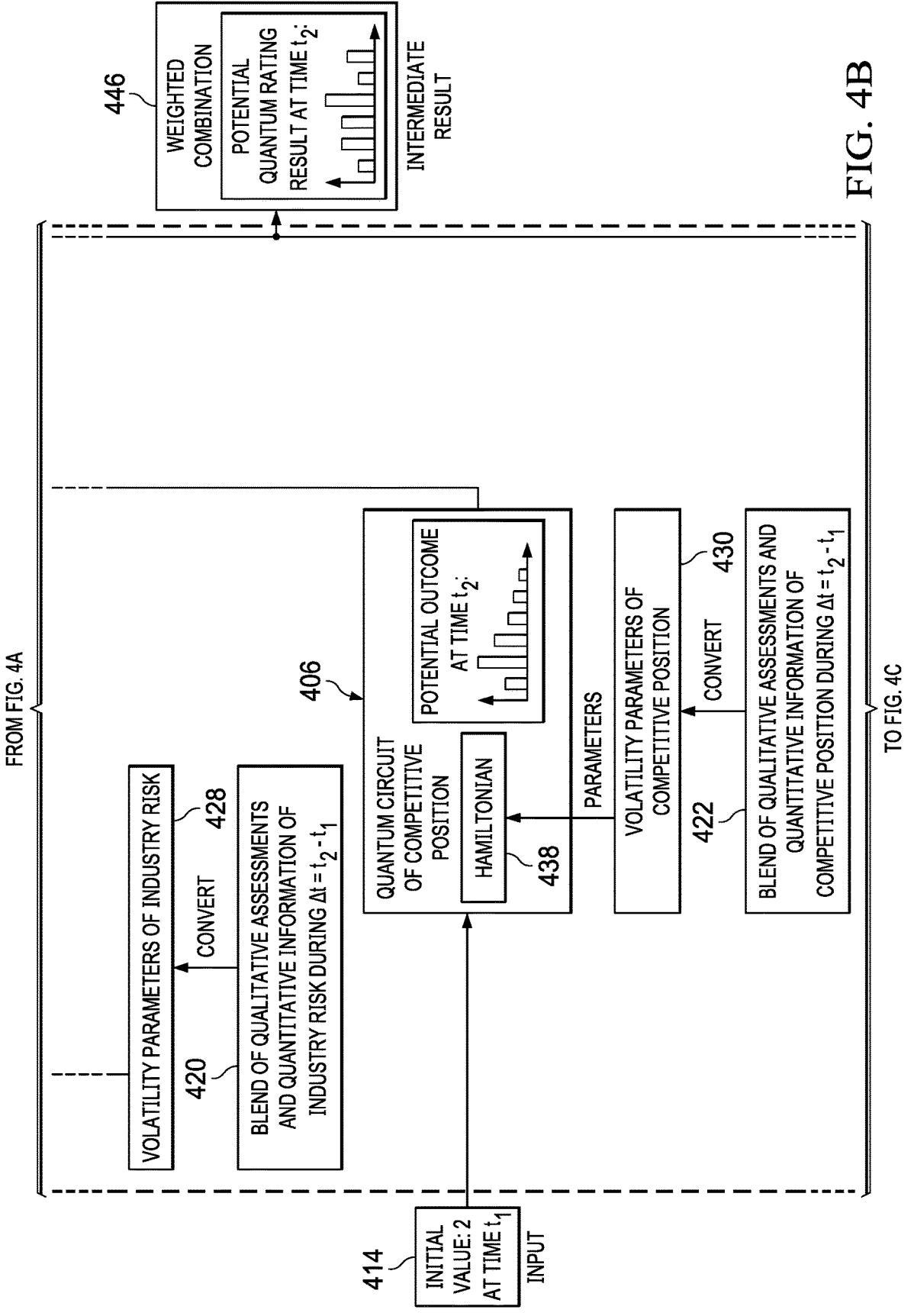
FIG. 4B depicts a block diagram illustrating a detailed view of a second section of the quantum rating part within the quantum rating framework in accordance with an illustrative embodiment.
Figure 4C:
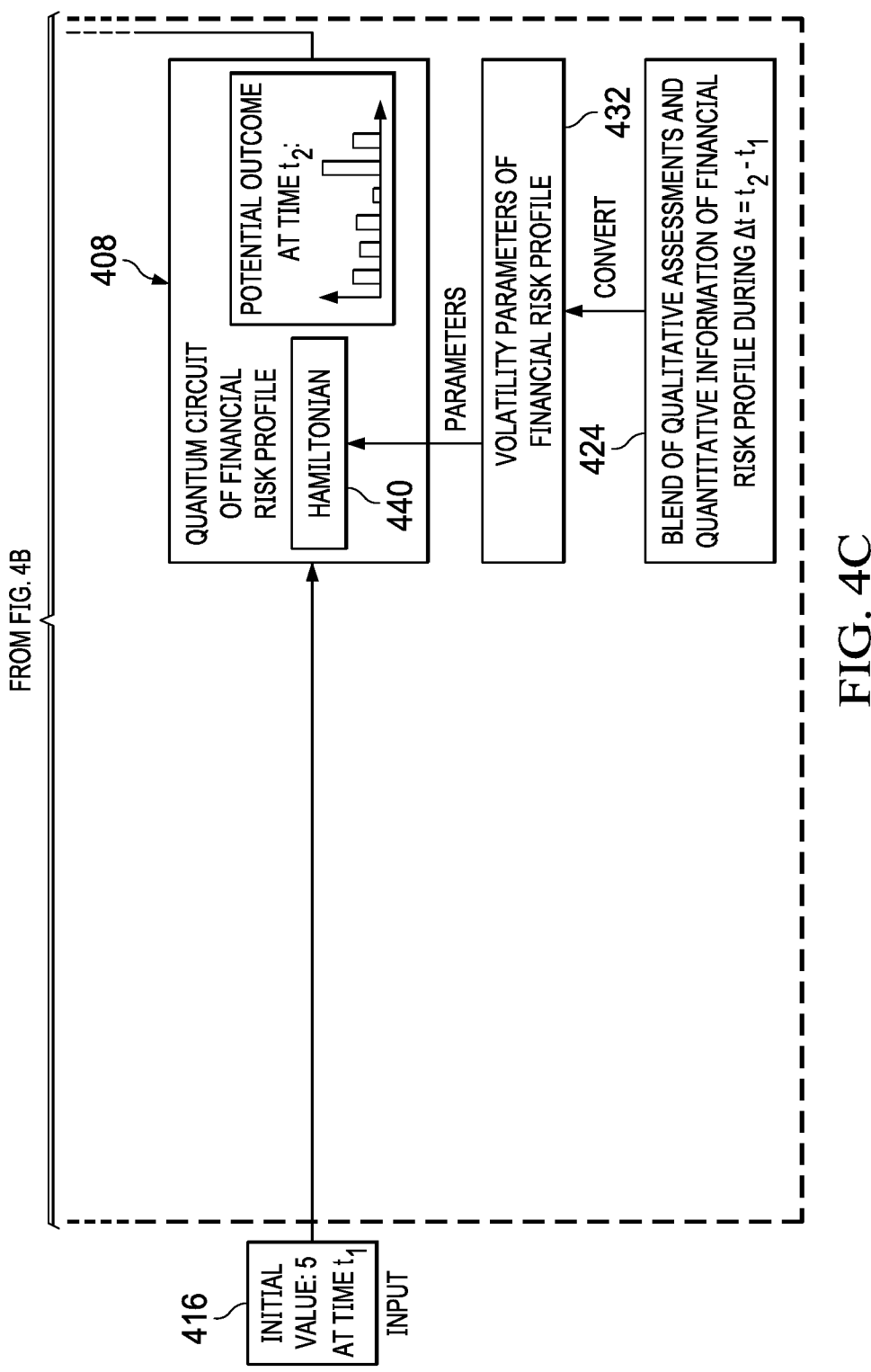
FIG. 4C depicts a block diagram illustrating a detailed view of a third section of the quantum rating part within the quantum rating framework in accordance with an illustrative embodiment.

FIGS. 4A-4C depict block diagrams illustrating a detailed view of the quantum rating part 302 within the quantum rating framework 300 in accordance with an illustrative embodiment. In the present example, the corporate quantum rating system divides the quantum rating task into four factors: country risk factor, industry risk factor, competitive position factor, and financial risk Profile factor, similar to corporate criteria framework 200 in FIG. 2.

Each factor is represented in a respective quantum circuit in the quantum rating system. In the present example, country risk is represented by quantum circuit 402, industry risk is represented by quantum circuit 404, competitive position is represented by quantum circuit 406, and financial risk profile is represented by quantum circuit 408. Each quantum circuit 402, 404, 406, 408 receives a respective input deterministic value 410, 412, 414, 416 for the factor represented by that circuit at time $t_1$. For example, the quantum circuit 402 for the country risk factor receives an initial value/score of 4 (meaning moderately high risk) at time $t_1$.

In the quantum circuit of each factor, there is a core component called the Hamiltonian 434, 436, 438, 440, which represents the factor's volatility level at a given time. During an evolution time interval $\Delta t$ after $t_1$, the quantum circuits continuously (or periodically) update their respective Hamiltonian parameters to reflect the factors' momentary volatility level. The respective volatility parameters 426, 428, 430, 432 of each factor at a given moment during the evolution time interval $\Delta t$ is a synthesis of all impacts from the sub-factors on the factors' volatility. Thus, the volatility parameters 426, 428, 430, 432 of the factors at a given moment are converted from the blend of qualitative assessments and quantitative information 418, 420, 422, 424.

For example, in the quantum circuit 402 of country risk factor during $\Delta t$, the impacts of the country risk's sub-factors, such as the economic risk, institutional and governance effectiveness risk, and the financial system risk in the country in which the company operates, are converted into the volatility parameters 426 of the country risk factor at every moment (or at a certain time step) during $\Delta t$. These parameters 426 are then used to update the Hamiltonian 434 in the quantum circuit 402 of the country risk to reflect the volatility level of the country risk factor at that moment.

After evolving the initially deterministic value of each factor for a period $\Delta t$ in its corresponding quantum circuit, each factor has incorporated the impacts of its volatility during $\Delta t$ into its value, so that the value of each factor at time $t_2$, where $t_2=t_1+\Delta t$, is represented by a stochastic distribution, which represents the factor's possibility magnitude being rated at each rating scale.

At time $t_2$, the quantum value outputs of the four quantum circuits 402, 404, 406, 408 are combined. In the illustrated example as shown in FIGS. 4A-4C, the weighted combination method used is the same as that of the classical corporate criteria framework 200 in FIG. 2. As such, the output of the country risk quantum circuit 402 is combined with the output of the industry risk quantum circuit 404 to produce CICRA weighted combination 442. CICRA weight combination 442 is combined with the output of the competitive position quantum circuit 406 to produce potential risk weighted combination 444, which is combined with the output of the financial risk profile quantum circuit 408 to produce the overall intermediate quantum result 446. Whereas the combined outputs 212, 214, 218 of the classical corporate criteria framework 200 are discreet values, weight combinations 442, 444, 446 produced by quantum rating part 402 are stochastic distributions.

As an intermediate result at time $t_2$, the intermediate quantum result 446 for the rating objective (i.e., the Issuer Credit Rating for a company) is represented by a stochastic distribution ranging from AAA to CCC, with each rating scale having a rated probability ranging from 0% to 100%.

Referring back to FIG. 3, the intermediate quantum result at time $t_2$ is put into the classical modification system 304.

The blend of qualitative assessments and quantitative information 318 of the modifiers for the rating objective is put into the classical modification system 316 as parameters for modification and fine-tuning at time $t_2$. As a result, the distribution of the intermediate quantum result may be shifted or adjusted a little due to the impacts of the classical modifiers, and the final quantum rating result 320 for the rating objective is output from the classical modification system 316 at time $t_2$ as the final result of the corporate quantum rating framework 300.

Figure 5:
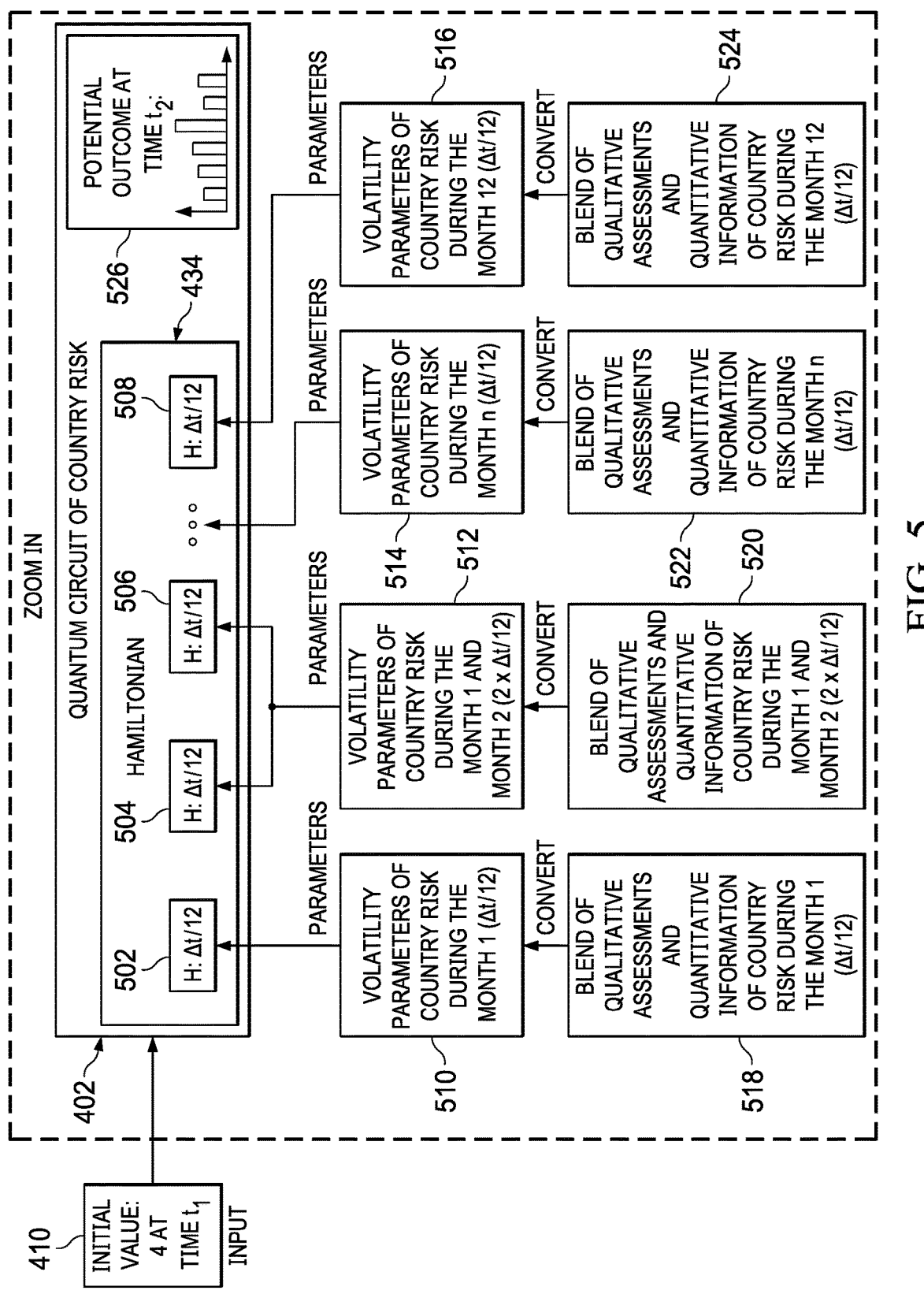
FIG. 5 depicts a block diagram illustrating the operation of a risk factor quantum circuit over an evolution time interval in accordance with an illustrative embodiment.
Figures 6A, 6B:
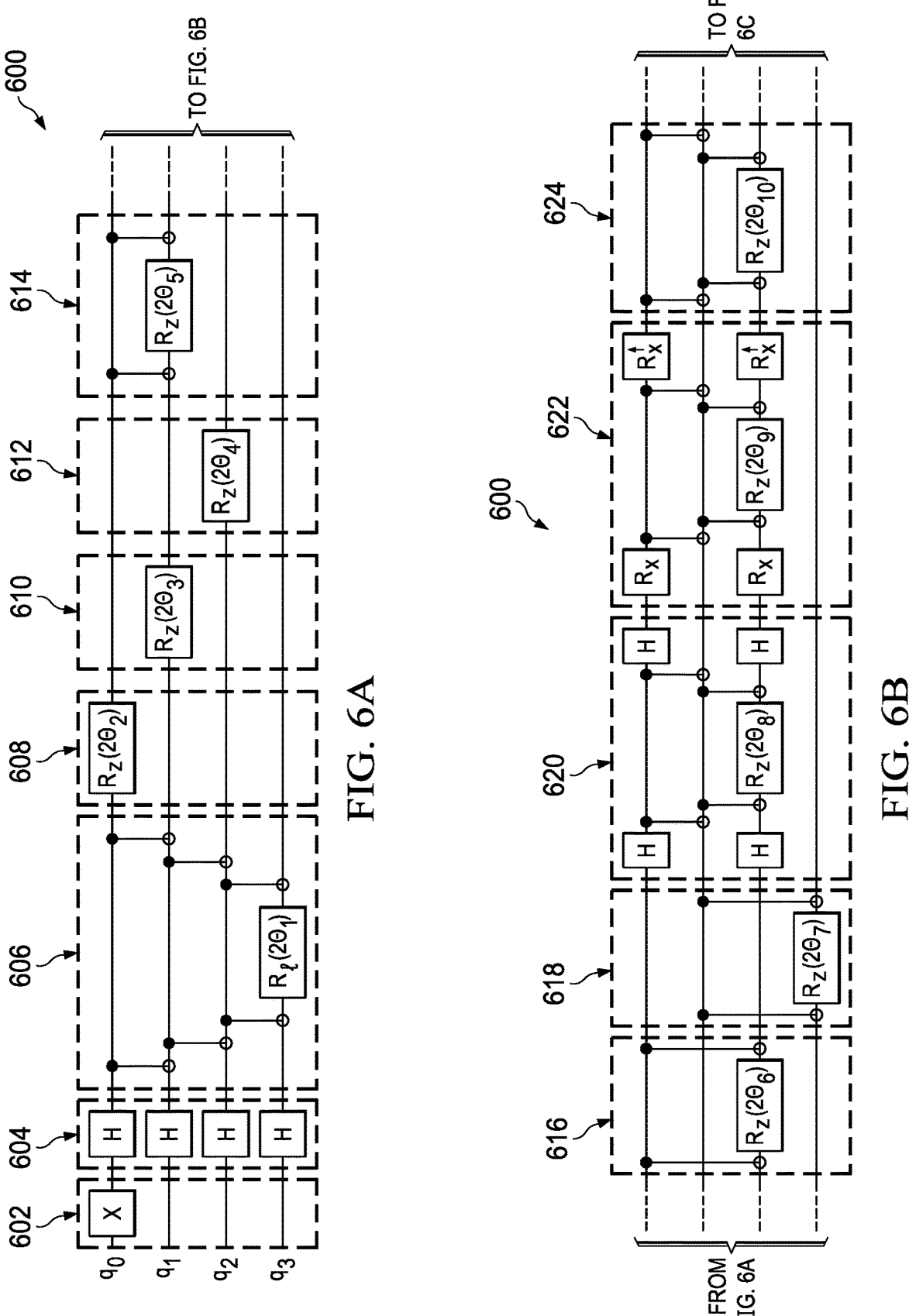
FIG. 6A depicts a first section of quantum circuit for calculating a sub-Hamiltonian for quantum rating framework in accordance with an illustrative embodiment.
FIG. 6B depicts a second part of a quantum circuit for calculating a sub-Hamiltonian for quantum rating framework in accordance with an illustrative embodiment.
Figure 6C:
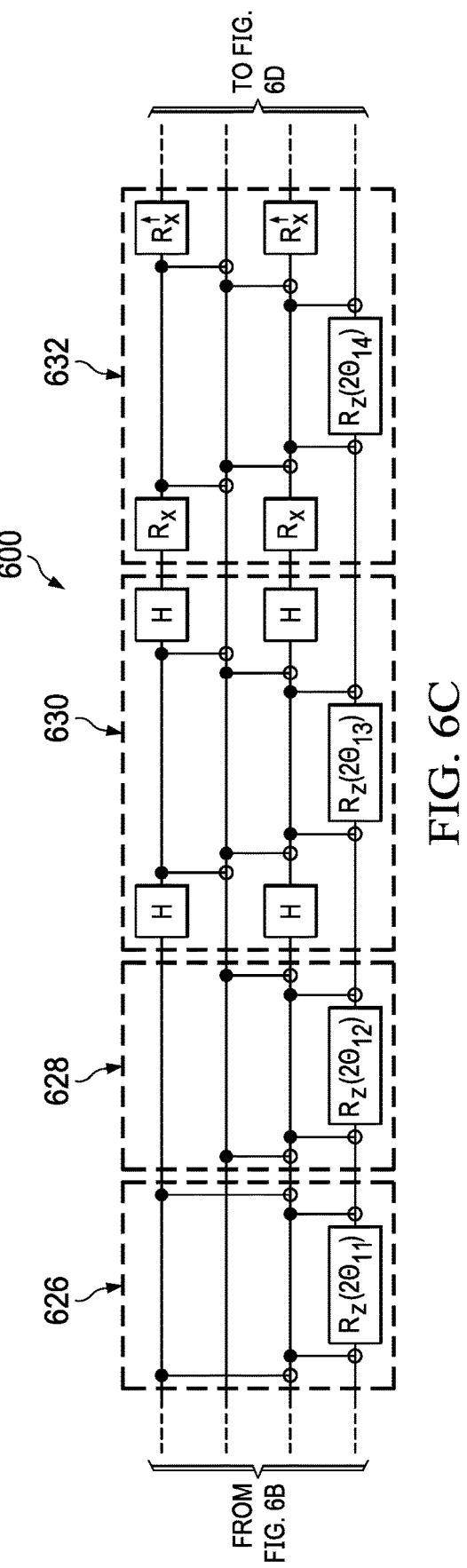
FIG. 6C depicts a third part of a quantum circuit for calculating a sub-Hamiltonian for quantum rating framework in accordance with an illustrative embodiment.
Figure 6D:
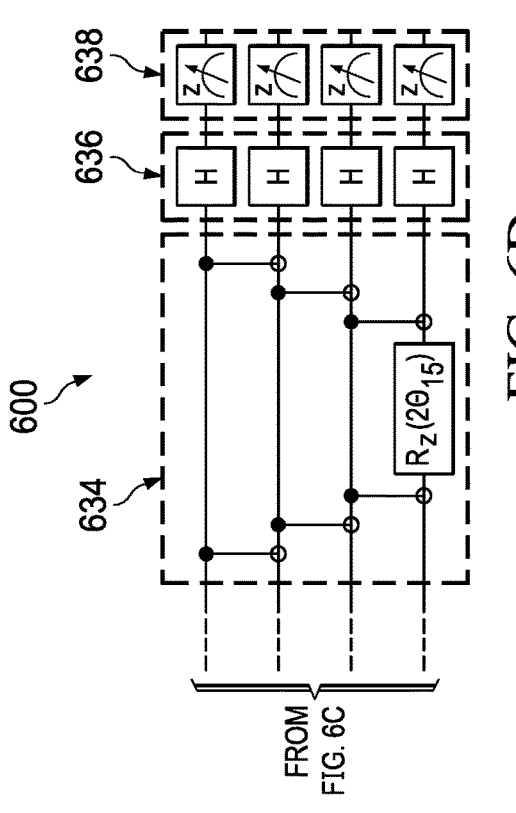
FIG. 6D depicts a fourth part of a quantum circuit for calculating a sub-Hamiltonian for quantum rating framework in accordance with an illustrative embodiment.

FIG. 5 depicts a block diagram illustrating the operation of a risk factor quantum circuit over an evolution time interval in accordance with an illustrative embodiment. FIG. 5 illustrates how the operation of a factor quantum circuit may operate over a number of time steps comprising the evolution time interval $\Delta t$. The present example uses the country risk quantum circuit 402 from FIG. 4A, but it should be understood that the same principles of operation apply to the quantum circuits of other factors.

The evolution time interval $\Delta t$ in the quantum circuit 402 can represent any time length given an appropriate circumstance. For example, assuming $\Delta t$ represents a one-year period, the Hamiltonian 434 in the country risk quantum circuit 402 can be divided into 12 sub-Hamiltonians 502-508, each one representing a $\Delta t/12$ time interval. In the present example, each period $\Delta t/12$ represents a month.

Each of the sub-Hamiltonians 502-508 represents the country risk factor's volatility during that month. In the present example, the quantum circuit 402 takes its initially deterministic value 410 at time $t_1$ as input, where $t_1$ is the beginning of a year. The blend of qualitative assessments and quantitative information 518 of the country risk factor (which is the synthesis of the information of its sub-factors) during the first month is converted into the country risk factor's volatility parameters 510 for the first month's Hamiltonian 502. After one month of evolution, the country risk factor's value/score is already transferred from an initial deterministic value 410 at time $t_1$ to a stochastic quantum value at the end of the first month (at time $t_1+\Delta t/12$).

The quantum value at the end of the first month enters the second-month Hamiltonian 504, whose volatility parameters 512 are converted from the blend of qualitative assessments and quantitative information 520 of the country risk factor during the second month. The volatility of the country risk factor during the second month may be higher or lower than during the first month. After another month's evolution, the country risk factor's rating is evolved from the quantum rating at the end of the first month (time $t_1+\Delta t/12$) to a different quantum rating at the end of the second month (at time $t_1+2\times\Delta t/12$).

Similarly, during the third month ($t_1+3\times\Delta t/12$), a similar process is repeated. The volatilities during different periods can be the same or different. The volatility of a factor during a certain period is dependent on the impacts of its qualitative and quantitative information during the period. In the present example, the volatility parameters 512 of the country risk factor during the third month is the same as that during the second month. Subsequent sub-Hamiltonians during the evolution time interval $\Delta t$ might have volatility parameters 514 that differ from the volatility parameters 510, 512 of previous months due to different qualitative assessments and quantitative information 522 during those subsequent time periods.

The quantum value of the risk factor keeps evolving under each month's volatility impacts up through the qualitative assessments and quantitative information 524 and volatility parameters 516 for sub-Hamiltonian 508 at the end of the year ($t_2=t_1+\Delta t =t_1+12\times\Delta t/12$) . The output from quantum circuit 402 is a quantum value 526 of the country risk factor with a stochastic distribution at the end of the year ($t_2$).

Compared to the classical deterministic rating frameworks, the quantum rating framework provides the potential of automatically incorporating significantly more factors for a rated entity by leveraging the fact that quantum systems can process exponentially large quantities of information simultaneously in only polynomial time. By conceptualizing the rating factors' classical impact information into quantum volatility information, the quantum rating framework is useful for general purposes in ratings.

Table 1 illustrates an example of a one-year simulation of credit ratings transitions with the quantum rating framework.

TABLE 1

| Unit [%] | To_AAA | To_A+ | To_BB | To_CCC |
|---|---|---|---|---|
| Init_AAA | 91.15 | 8.15 | 0.60 | 0.10 |
| Init_A+ | 1.28 | 90.64 | 7.06 | 1.01 |
| Init_BB | 0.74 | 6.75 | 85.11 | 7.40 |
| Init_CCC | 1.28 | 2.90 | 12.80 | 83.02 |

The first column represents the initial deterministic rating value input into the quantum rating framework, and the top row represents the final quantum rating output by the framework for a one-year evolution time interval. Each row summarizes the percentage of assets that start the evolution period at the rating value in the far-left column and diffuse over the other rating values, representing the stochastic distribution over the one-year period. For example, in Table 1, 91.15% of the assets that begin the year with a AAA rating maintain that rating at the end of the year, while 8.15% diffuse to an A+ rating, 0.60% diffuse to BB, and 0.10% diffuse to CCC.

For ease of illustration, the present example only uses four rating levels, AAA, A+, BB, and CCC, but it should be understood that more or fewer numbers of ratings are possible.

FIGS. 6A-6D depict a quantum circuit for calculating a sub-Hamiltonian for quantum rating framework in accordance with an illustrative embodiment. Quantum circuit 600 may be implemented in quantum rating system 308 in FIG. 3 and can be used for each risk factor as shown in FIGS. 4 and 5.

For space and ease of illustration the quantum circuit 600 has been divided into four sections shown respectively in FIGS. 6A-6D, but it should be understood that the respective sections shown in FIGS. 6A-6D form a single circuit end-to-end. The complete quantum circuit 600 shown in FIGS. 6A-6D would be used to calculate each sub-Hamiltonian within an evolution time interval, such as shown in FIG. 5.

Schrodinger's equation is:

$$\frac{\partial}{\partial t} |\psi\rangle = -i\hat{H}|\psi\rangle$$

Solving Schrodinger's equation yields:

$$|\psi(t)\rangle = e^{-i\hat{H}t}|\psi(0)\rangle \qquad \text{Eq. 1}$$

Quantum circuit 600 simulates the Hamiltonian-based operator $e^{-i\hat{H}t}$, where:

$$e^{-i\hat{H}t} = e^{-i\hat{H}_{BK}t} = e^{-i\left(p_1 1 + p_2 \sigma_0^z + p_3 \sigma_1^z + \ldots\right)t} = e^{-ip_1 t 1} \cdot e^{-ip_2 t \sigma_0^z} \cdot e^{-ip_3 t \sigma_1^z} \ldots \quad \text{Eq. 2}$$

where $p_1$, $p_2$, $p_3$, . . . are the volatility parameters corresponding to the operators 1, $$\sigma_0^z, \sigma_1^z,$$

etc.

Each of the sub-Hamiltonian in the quantum rating system has an operation structure that can be mathematically represented as $e^{-i\hat{H}_{BK}t}$, wherein:

$$\hat{H}_{BK} = \left(\frac{h_{00}}{2} + \frac{h_{11}}{2} + \frac{h_{22}}{2} + \frac{h_{33}}{2} + \frac{h_{0110}}{4} + \right. \quad \text{Eq. 3}$$
$$\left. \frac{h_{0330}}{4} + \frac{h_{1221}}{4} + \frac{h_{2332}}{4} + \frac{h_{0220} - h_{0202}}{4} + \frac{h_{1331} - h_{1313}}{4}\right)1 -$$
$$\left(\frac{h_{00}}{2} + \frac{h_{0110}}{4} + \frac{h_{0330}}{4} + \frac{h_{0220} - h_{0202}}{4}\right)\sigma_0^z + \left(\frac{h_{0110}}{4}\right)\sigma_1^z -$$
$$\left(\frac{h_{22}}{2} + \frac{h_{1221}}{4} + \frac{h_{2332}}{4} + \frac{h_{0220} - h_{0202}}{4}\right)\sigma_2^z -$$
$$\left(\frac{h_{11}}{2} + \frac{h_{0110}}{4} + \frac{h_{1221}}{4} + \frac{h_{1331} - h_{1313}}{4}\right)\sigma_0^z \sigma_1^z +$$
$$\left(\frac{h_{0220} - h_{0202}}{4}\right)\sigma_0^z \sigma_2^z + \left(\frac{h_{2332}}{4}\right)\sigma_1^z \sigma_3^z + \left(\frac{h_{0132}}{4}\right)\sigma_0^x \sigma_1^z \sigma_2^x +$$
$$\left(\frac{h_{0132}}{8} + \frac{h_{0312}}{8}\right)\sigma_0^y \sigma_1^z \sigma_2^y + \left(\frac{h_{1221}}{4}\right)\sigma_0^z \sigma_1^z \sigma_2^z + \left(\frac{h_{1331} - h_{1313}}{4}\right)\sigma_0^z \sigma_2^z \sigma_3^z -$$
$$\left(\frac{h_{33}}{2} + \frac{h_{0330}}{4} + \frac{h_{2332}}{4} + \frac{h_{1331} - h_{1313}}{4}\right)\sigma_1^z \sigma_2^z \sigma_3^z +$$
$$\left(\frac{h_{0132}}{8} + \frac{h_{0312}}{8}\right)\sigma_0^x \sigma_1^z \sigma_2^z \sigma_3^z +$$
$$\left(\frac{h_{0132}}{8} + \frac{h_{0312}}{8}\right)\sigma_0^y \sigma_1^z \sigma_2^y \sigma_3^z + \left(\frac{h_{0330}}{4}\right)\sigma_0^z \sigma_1^z \sigma_2^z \sigma_3^z$$

The different sections of quantum circuit 600 represent the different terms in Equation 2. In the present example, quantum circuit 600 comprises four qubits, $q_0 0$, $q_1$, $q_2$, $q_3$, representing four ratings values AAA, A+, BB, CCC, respectively. If the number of possible ratings is greater or fewer than four, the number of corresponding qubits will match them accordingly.

In section 602, initially all qubits are in $|0\rangle$ state by default. By applying the X gate on the qubit $q_0$, its state is turned from $|0\rangle$ to $|1\rangle$.

In section 604, the Hadamard operators change the basis of the operation so that the rotation angle of each qubit can be manipulated.

Section 606 represents the effects of the identity operator 1 in $\hat{H}_{BK}$, as shown in Equation 3. $\theta_1$ represent the corresponding parameter $-ip_1 t$ of this operator. Thus, this fraction of circuit represents:

$$e^{-it\left(\frac{h_{00}}{2} + \frac{h_{11}}{2} + \frac{h_{22}}{2} + \frac{h_{33}}{2} + \frac{h_{0110}}{4} + \frac{h_{0330}}{4} + \frac{h_{1221}}{4} + \frac{h_{2332}}{4} + \frac{h_{0220} - h_{0202}}{4} + \frac{h_{1331} - h_{1313}}{4}\right)1}$$

Similarly, section 608 represents the effects of $$\sigma_0^z$$

operator, and the $\theta_2$ represents the corresponding parameter $-ip_2 t$. Thus, this fraction of quantum circuit 600 represents:

$$e^{-it\left[-\left(\frac{h_{00}}{2} + \frac{h_{0110}}{4} + \frac{h_{0330}}{4} + \frac{h_{0220} - h_{0202}}{4}\right)\right]\sigma_0^z}$$

Section 610 represents:

$$e^{-it\left(\frac{h_{0110}}{4}\right)\sigma_1^z}$$

Section 612 represents:

$$e^{-it\left[-\left(\frac{h_{22}}{2} + \frac{h_{1221}}{4} + \frac{h_{2332}}{4} + \frac{h_{0220} - h_{0202}}{4}\right)\right]\sigma_2^z}$$

Section 614 represents:

$$e^{-it\left[-\left(\frac{h_{11}}{2} + \frac{h_{0110}}{4} + \frac{h_{1221}}{4} + \frac{h_{1331} - h_{1313}}{4}\right)\right]\sigma_0^z \sigma_1^z}$$

Section 616 represents:

$$e^{-it\left(\frac{h_{0220} - h_{0202}}{4}\right)\sigma_0^z \sigma_2^z}$$

Section 618 represents:

$$e^{-it\left(\frac{h_{2332}}{4}\right)\sigma_1^z \sigma_3^z}$$

Section 620 represents:

$$e^{-it\left(\frac{h_{0132}}{4}\right)\sigma_0^x \sigma_1^z \sigma_2^x}$$

Section 622 represents:

$$e^{-it\left(\frac{h_{0132}}{8} + \frac{h_{0312}}{8}\right)\sigma_0^y \sigma_1^z \sigma_2^y}$$

Section 624 represents:

$$e^{-it\left(\frac{h_{1221}}{4}\right)\sigma_0^z \sigma_1^z \sigma_2^z}$$

Section 626 represents:

$$e^{-it\left(\frac{h_{1331} - h_{1313}}{4}\right)\sigma_0^z \sigma_2^z \sigma_3^z}$$

Section 628 represents:

$$e^{-it\left[-\left(\frac{h_{33}}{2} + \frac{h_{0330}}{4} + \frac{h_{2332}}{4} + \frac{h_{1331} - h_{1313}}{4}\right)\right]\sigma_1^z \sigma_2^z \sigma_3^z}$$

Section 630 represents:

$$e^{-it\left(\frac{h_{0132}}{8}+\frac{h_{0312}}{8}\right)\sigma_0^z\sigma_1^z\sigma_2^z\sigma_3^z}$$

Section 632 represents:

$$e^{-it\left(\frac{h_{0132}}{8}+\frac{h_{0312}}{8}\right)\sigma_0^y\sigma_1^z\sigma_2^y\sigma_3^z}$$

Section 634 represents:

$$e^{-it\left(\frac{h_{0330}}{4}\right)\sigma_0^z\sigma_1^z\sigma_2^z\sigma_3^z}$$

In section 636, the Hadamard operators change the basis back so that rotation angle of each qubit can be measured, and section 638 measures the final angular magnitudes of each qubit.

FIG. 7 depicts a flowchart illustrating a process for rating risk in accordance with an illustrative embodiment. The process 700 can be implemented in hardware, software, or both. When implemented in software, the process can take the form of program code that is run by one of more processors located in one or more hardware devices in one or more computer systems. Process 700 might be implemented in quantum rating framework 100 shown in FIG. 1.

Process 700 begins by receiving, at a first time ($t_1$), respective deterministic values for a number of risk factors (step 702).

Process 700 generates respective stochastic quantum values for each risk factor from the deterministic ratings over an evolution time interval ($\Delta t$) starting at the first time (step 704). Each risk factor may be represented by a respective N-qubit quantum circuit, wherein each qubit represents a risk rating level. For example, the risk factors may comprise country risk, industry risk, competitive position, and financial risk profile. For such an example, the N-qubit quantum circuit would be a four-qubit quantum circuit.

Each quantum circuit may convert a combination of qualitative and quantitative information about a risk factor for the evolution time interval into volatility parameters of the risk factor and calculates a Hamiltonian for the risk factor defined from the volatility parameters for the evolution time interval.

The evolution time interval may be divided into a number of equal successive sub-intervals, and wherein the quantum circuit processes separate volatility parameters and a separate sub-Hamiltonian for each sub-interval. The quantum circuit may comprise separate quantum circuits for each sub-Hamiltonian that are concatenated together.

Process 700 combines the quantum values for the risk factors into an intermediate quantum risk value at a second time ($t_2$) at the end of the evolution time interval (step 706). The quantum values for the risk factors may be weighted according to classical criteria when combined.

The intermediate quantum risk value is then modified according to a number of classical parameters (step 708). The classical parameters may comprise at least one of diversification, capital structure, financial policy, liquidity, governance, or comparable ratings analysis.

A final stochastic quantum risk rating value is generated at the second time from the modified intermediate quantum risk value (step 710). Process 700 then ends.

Figure 8:
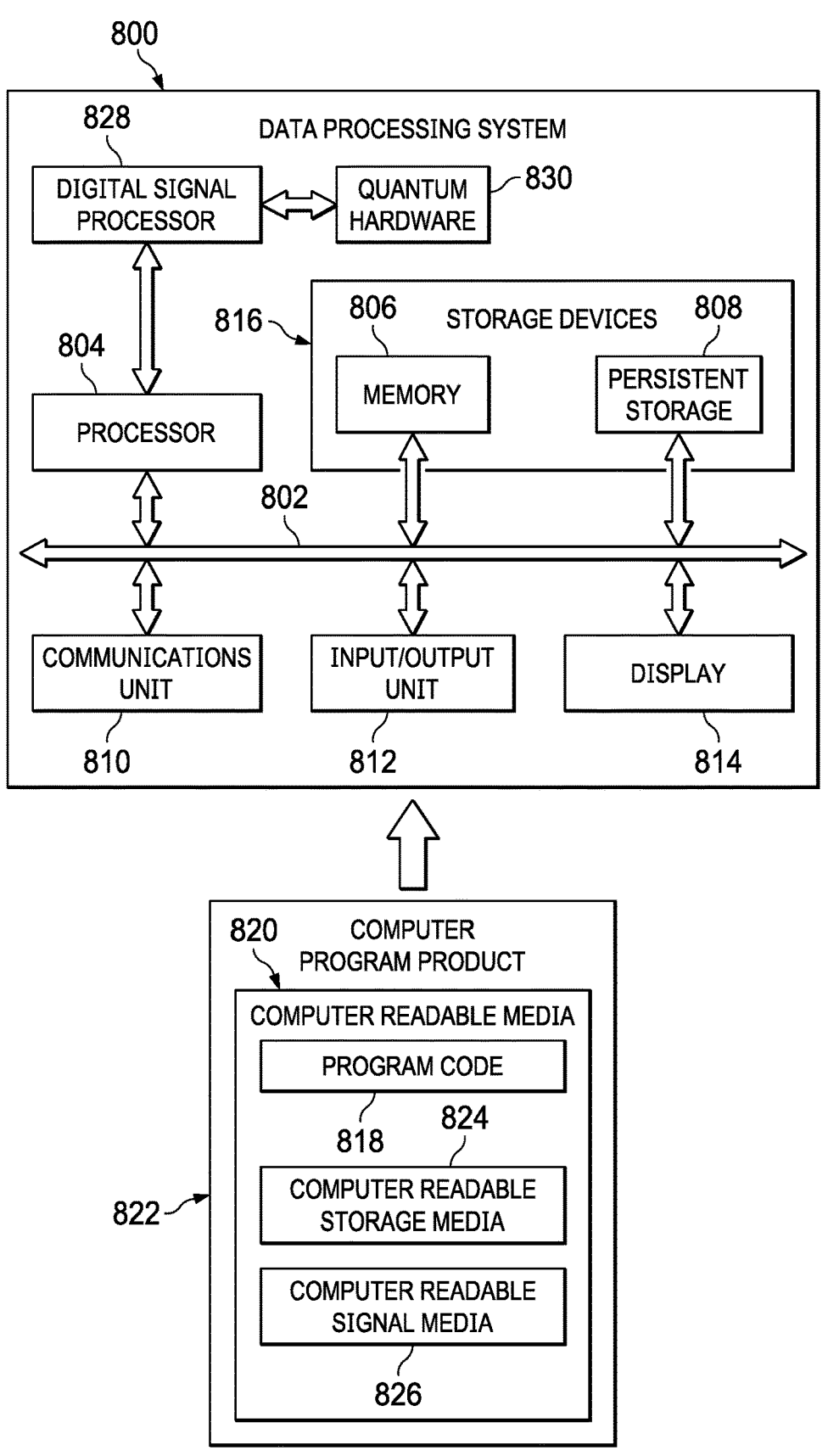
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement quantum rating framework 100 in FIG. 1. In this illustrative example, data processing system 800 includes communications framework 802, which provides communications between processor unit 804, memory 806, persistent storage 808, communications unit 810, input/output (I/O) unit 812 and display 814. In this example, communications framework 802 takes the form of a bus system.

Processor unit 804 serves to execute instructions for software that can be loaded into memory 806. Processor unit 804 may include one or more processors such as central processors units (CPUs). Processor unit 804 may send instructions to and from digital signal processor (DSP) 828. DSP 828 in turn sends analog or hybrid signals to and from quantum hardware 830.

Quantum hardware 830 may comprise quantum circuits based on qubits (quantum bits). Qubits are traditionally used to simulate a 1 or 0 state, or in a superposition of the 1 and 0 states. However, when measured, the qubit may be in an infinite number of states depending on the qubit's quantum state immediately prior to measurement when using a Bloch sphere representation. The quantum circuits may comprise a number of reversible quantum gates in which computational processes are logically reversible.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

Persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media 826. The computer-readable signal media 826 can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in program code 818 can be located in a separate data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 806, or portions thereof, may be incorporated in processor unit 804 in some illustrative examples.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for calculating risk, the method comprising:

using a number of processors to perform the steps of:

receiving, at a first time, respective deterministic values for a number of factors;

generating, over an evolution time interval starting at the first time, respective stochastic quantum values for each factor from the deterministic values, wherein each factor is represented by a respective 4-qubit quantum circuit, wherein each qubit represents a risk level, and wherein each 4-qubit quantum circuit comprises in sequence:

a NOT gate applied to the first qubit in the 4-qubit quantum circuit;

a first set of Hadamard gates applied to all four of the qubits;

a first set of CNOT gates that compute parity of all four of the qubits, a first single-bit phase rotation gate, and a second set of CNOT gates that uncompute the parity of the four qubits;

a second single-bit phase rotation applied to the first qubit;

a third single-bit phase rotation applied to the second qubit a fourth single-bit phase rotation applied to the third qubit;

a first CNOT gate that computes parity of the first and second qubits, a fifth single-bit phase rotation gate, and a second CNOT gate that uncomputes the parity of the first and second qubits;

a third CNOT gate that computes parity of the first and third qubits, a sixth single-bit phase rotation gate, and a fourth CNOT gate that uncomputes the parity of the first and third qubits;

a fifth CNOT gate that computes parity of the second and fourth qubits, a seventh single-bit phase rotation gate, and a sixth CNOT gate that uncomputes the parity of the second and fourth qubits;

a second set of Hadamard gates applied to the first and third qubits, a third set of CNOT gates that compute parity of the first, second, and third qubits, an eighth single-bit phase rotation gate, a fourth set of CNOT gates that uncompute the parity of the first, second, and third qubits, and a third set of Hadamard gates applied to the first and third qubits;

a first set of phase rotation gates applied to the first and third qubits, a fifth set of CNOT gates that compute parity of the first, second, and third qubits, a nineth single-bit phase rotation gate, a sixth set of CNOT gates that uncompute the parity of the first, second, and third qubits, and a second set of phase rotations gates applied to the first and third qubits;

a seventh set of CNOT gates that compute parity of the first, second, and third qubits, a tenth single-bit phase rotation gate, and an eighth set of CNOT gates that uncompute the parity of the first, second, and third qubits;

a nineth set of CNOT gates that compute parity of the first, third, and fourth qubits, an eleventh single-bit phase rotation gate, and a tenth set of CNOT gates that uncompute the parity of the first, third, and fourth qubits;

an eleventh set of CNOT gates that compute parity of the second, third, and fourth qubits, a twelfth single-bit phase rotation gate, and a twelfth set of CNOT gates that uncompute the parity of the second, third, and fourth qubits;

a fourth set of Hadamard gates applied to the first and third qubits, a thirteenth set of CNOT gates that compute parity of all four qubits, a thirteenth single-bit phase rotation gate, a fourteenth set of CNOT gates that uncompute the parity of the four qubits, and a fifth set of Hadamard gates applied to the first and third qubits;

a third set of phase rotation gates applied to the first and third qubits, a fifteenth set of CNOT gates that compute parity of all four qubits, a fourteenth single-bit phase rotation gate, a sixteenth set of CNOT gates that uncompute the parity of the four qubits, and a fourth set of phase rotations gates applied to the first and third qubits;

a seventeenth set of CNOT gates that compute parity of all four of the qubits, a sixteenth single-bit phase rotation gate, and an eighteenth set of CNOT gates that uncompute the parity of the four qubits;

a sixth set of Hadamard gates applied to all four qubits; and a set of measurement gates applied to all four qubits;

combining the quantum values for the factors into an intermediate quantum risk value at a second time at the end of the evolution time interval;

modifying the intermediate quantum risk value according to a number of classical parameters; and generating, from the modified intermediate quantum risk value, a final stochastic quantum risk value at the second time.

2. The method of claim 1, wherein each quantum circuit converts a combination of qualitative and quantitative information about a factor for the evolution time interval into volatility parameters of the factor and calculates a Hamiltonian for the factor defined from the volatility parameters for the evolution time interval.

3. The method of claim 2, wherein the evolution time interval is divided into a number of equal successive sub-intervals, and wherein the quantum circuit processes separate volatility parameters and a separate sub-Hamiltonian for each sub-interval.

4. The method of claim 3, wherein the quantum circuit comprises separate quantum circuits for each sub-Hamiltonian that are concatenated together.

5. The method of claim 1, wherein the quantum values for the factors are weighted according to classical criteria when combined.

6. The method of claim 1, wherein the N-qubit quantum circuit is a four-qubit quantum circuit.

7. The method of claim 1, wherein the factors comprise:

country risk;

industry risk;

competitive position; and financial risk profile.

8. The method of claim 1, wherein the classical parameters comprise at least one of:

diversification;

capital structure;

financial policy;

liquidity;

governance; or comparable ratings analysis.

9. A system for calculating risk, the system comprising:

a storage device configured to store program instructions; and one or more processors operably connected to the storage device and configured to execute the program instructions to cause the system to:

receive, at a first time, respective deterministic values for a number of factors;

generate, over an evolution time interval starting at the first time, respective stochastic quantum values for each factor from the deterministic values, wherein each factor is represented by a respective 4-qubit quantum circuit, wherein each qubit represents a risk level, and wherein each 4-qubit quantum circuit comprises in sequence:

a NOT gate applied to the first qubit in the 4-qubit quantum circuit;

a first set of Hadamard gates applied to all four of the qubits;

a first set of CNOT gates that compute parity of all four of the qubits, a first single-bit phase rotation gate, and a second set of CNOT gates that uncompute the parity of the four qubits;

a second single-bit phase rotation applied to the first qubit;

a third single-bit phase rotation applied to the second qubit a fourth single-bit phase rotation applied to the third qubit;

a first CNOT gate that computes parity of the first and second qubits, a fifth single-bit phase rotation gate, and a second CNOT gate that uncomputes the parity of the first and second qubits;

a third CNOT gate that computes parity of the first and third qubits, a sixth single-bit phase rotation gate, and a fourth CNOT gate that uncomputes the parity of the first and third qubits;

a fifth CNOT gate that computes parity of the second and fourth qubits, a seventh single-bit phase rotation gate, and a sixth CNOT gate that uncomputes the parity of the second and fourth qubits;

a second set of Hadamard gates applied to the first and third qubits, a third set of CNOT gates that compute parity of the first, second, and third qubits, an eighth single-bit phase rotation gate, a fourth set of CNOT gates that uncompute the parity of the first, second, and third qubits, and a third set of Hadamard gates applied to the first and third qubits;

a first set of phase rotation gates applied to the first and third qubits, a fifth set of CNOT gates that compute parity of the first, second, and third qubits, a nineth single-bit phase rotation gate, a sixth set of CNOT gates that uncompute the parity of the first, second, and third qubits, and a second set of phase rotations gates applied to the first and third qubits;

a seventh set of CNOT gates that compute parity of the first, second, and third qubits, a tenth single-bit phase rotation gate, and an eighth set of CNOT gates that uncompute the parity of the first, second, and third qubits;

a nineth set of CNOT gates that compute parity of the first, third, and fourth qubits, an eleventh single-bit phase rotation gate, and a tenth set of CNOT gates that uncompute the parity of the first, third, and fourth qubits;

an eleventh set of CNOT gates that compute parity of the second, third, and fourth qubits, a twelfth single-bit phase rotation gate, and a twelfth set of CNOT gates that uncompute the parity of the second, third, and fourth qubits;

a fourth set of Hadamard gates applied to the first and third qubits, a thirteenth set of CNOT gates that compute parity of all four qubits, a thirteenth single-bit phase rotation gate, a fourteenth set of CNOT gates that uncompute the parity of the four qubits, and a fifth set of Hadamard gates applied to the first and third qubits;

a third set of phase rotation gates applied to the first and third qubits, a fifteenth set of CNOT gates that compute parity of all four qubits, a fourteenth single-bit phase rotation gate, a sixteenth set of CNOT gates that uncompute the parity of the four qubits, and a fourth set of phase rotations gates applied to the first and third qubits;

a seventeenth set of CNOT gates that compute parity of all four of the qubits, a sixteenth single-bit phase rotation gate, and an eighteenth set of CNOT gates that uncompute the parity of the four qubits;

a sixth set of Hadamard gates applied to all four qubits; and a set of measurement gates applied to all four qubits;

combine the quantum values for the factors into an intermediate quantum risk value at a second time at the end of the evolution time interval;

modify the intermediate quantum risk value according to a number of classical parameters; and generate, from the modified intermediate quantum risk value, a final stochastic quantum risk value at the second time.

10. The system of claim 9, wherein each quantum circuit converts a combination of qualitative and quantitative information about a factor for the evolution time interval into volatility parameters of the factor and calculated a Hamiltonian for the factor defined from the volatility parameters for the evolution time interval.

11. The system of claim 10, wherein the evolution time interval is divided into a number of equal successive sub-intervals, and wherein the quantum circuit processes separate volatility parameters and a separate sub-Hamiltonian for each sub-interval.

12. The system of claim 11, wherein the quantum circuit comprises separate quantum circuits for each sub-Hamiltonian that are concatenated together.

13. The system of claim 9, wherein the quantum values for the factors are weighted according to classical criteria when combined.

14. The system of claim 9, wherein the N-qubit quantum circuit is a four-qubit quantum circuit.

15. The system of claim 9, wherein the factors comprise:

country risk;

industry risk;

competitive position; and financial risk profile.

16. The system of claim 9, wherein the classical parameters comprise at least one of:

diversification;

capital structure;

financial policy;

liquidity;

governance; or comparable ratings analysis.

17. A computer program product for calculating risk, the computer program product comprising:

a computer-readable storage medium having program instructions embodied thereon to perform the steps of:

receiving, at a first time, respective deterministic values for a number of factors;

generating, over an evolution time interval starting at the first time, respective stochastic quantum values for each factor from the deterministic values, wherein each factor is represented by a respective 4-qubit quantum circuit, wherein each qubit represents a risk level, and wherein each 4-qubit quantum circuit comprises in sequence:

a NOT gate applied to the first qubit in the 4-qubit quantum circuit;

a first set of Hadamard gates applied to all four of the qubits;

a first set of CNOT gates that compute parity of all four of the qubits, a first single-bit phase rotation gate, and a second set of CNOT gates that uncompute the parity of the four qubits;

a second single-bit phase rotation applied to the first qubit;

a third single-bit phase rotation applied to the second qubit a fourth single-bit phase rotation applied to the third qubit;

a first CNOT gate that computes parity of the first and second qubits, a fifth single-bit phase rotation gate, and a second CNOT gate that uncomputes the parity of the first and second qubits;

a third CNOT gate that computes parity of the first and third qubits, a sixth single-bit phase rotation gate, and a fourth CNOT gate that uncomputes the parity of the first and third qubits;

a fifth CNOT gate that computes parity of the second and fourth qubits, a seventh single-bit phase rotation gate, and a sixth CNOT gate that uncomputes the parity of the second and fourth qubits;

a second set of Hadamard gates applied to the first and third qubits, a third set of CNOT gates that compute parity of the first, second, and third qubits, an eighth single-bit phase rotation gate, a fourth set of CNOT gates that uncompute the parity of the first, second, and third qubits, and a third set of Hadamard gates applied to the first and third qubits;

a first set of phase rotation gates applied to the first and third qubits, a fifth set of CNOT gates that compute parity of the first, second, and third qubits, a nineth single-bit phase rotation gate, a sixth set of CNOT gates that uncompute the parity of the first, second, and third qubits, and a second set of phase rotations gates applied to the first and third qubits;

a seventh set of CNOT gates that compute parity of the first, second, and third qubits, a tenth single-bit phase rotation gate, and an eighth set of CNOT gates that uncompute the parity of the first, second, and third qubits;

a nineth set of CNOT gates that compute parity of the first, third, and fourth qubits, an eleventh single-bit phase rotation gate, and a tenth set of CNOT gates that uncompute the parity of the first, third, and fourth qubits;

an eleventh set of CNOT gates that compute parity of the second, third, and fourth qubits, a twelfth single-bit phase rotation gate, and a twelfth set of CNOT gates that uncompute the parity of the second, third, and fourth qubits;

a fourth set of Hadamard gates applied to the first and third qubits, a thirteenth set of CNOT gates that compute parity of all four qubits, a thirteenth single-bit phase rotation gate, a fourteenth set of CNOT gates that uncompute the parity of the four qubits, and a fifth set of Hadamard gates applied to the first and third qubits;

a third set of phase rotation gates applied to the first and third qubits, a fifteenth set of CNOT gates that compute parity of all four qubits, a fourteenth single- 19. The computer program product of claim 18, wherein the evolution time interval is divided into a number of equal successive sub-intervals, and wherein the quantum circuit calculates separate volatility parameters and a separate sub-Hamiltonian for each sub- interval.

bit phase rotation gate, a sixteenth set of CNOT gates that uncompute the parity of the four qubits, and a fourth set of phase rotations gates applied to the first and third qubits;

a seventeenth set of CNOT gates that compute parity of all four of the qubits, a sixteenth single-bit phase rotation gate, and an eighteenth set of CNOT gates that uncompute the parity of the four qubits;

a sixth set of Hadamard gates applied to all four qubits; and a set of measurement gates applied to all four qubits;

combining the quantum values for the factors into an intermediate quantum risk value at a second time at the end of the evolution time interval;

modifying the intermediate quantum risk value according to a number of classical parameters; and generating, from the modified intermediate quantum risk value, a final stochastic quantum risk value at the second time.

18. The computer program product of claim 17, wherein each quantum circuit converts a combination of qualitative and quantitative information about a factor for the evolution time interval into volatility parameters of the factor and calculates a Hamiltonian for the factor defined from the volatility parameters for the evolution time interval.

19. The computer program product of claim 18, wherein the evolution time interval is divided into a number of equal successive sub-intervals, and wherein the quantum circuit calculates separate volatility parameters and a separate sub-Hamiltonian for each sub- interval.

20. The computer program product of claim 19, wherein the quantum circuit comprises separate quantum circuits for each sub-Hamiltonian that are concatenated together.

21. The computer program product of claim 17, wherein the quantum values for the factors are weighted according to classical criteria when combined.

22. The computer program product of claim 17, wherein the N-qubit quantum circuit is a four-qubit quantum circuit.

23. The computer program product of claim 17, wherein the risk factors comprise:

country risk;

industry risk;

competitive position; and financial risk profile.

24. The computer program product of claim 17, wherein the classical parameters comprise at least one of:

diversification;

capital structure;

financial policy;

liquidity;

governance; or comparable ratings analysis.

* * * * *